United States Patent [19]

Kim

[11] Patent Number: 5,719,723
[45] Date of Patent: Feb. 17, 1998

[54] HEAD DRUM ASSEMBLY FOR ROTATING A ROTARY DRUM BY GENERATING A LOAD BEARING AIR LAYER

[75] Inventor: Keum-Mo Kim, Seoul, Rep. of Korea

[73] Assignee: Daewoo Electronics Co., Ltd., Seoul, Rep. of Korea

[21] Appl. No.: 578,364

[22] Filed: Dec. 26, 1995

[30] Foreign Application Priority Data

Dec. 27, 1994 [KR] Rep. of Korea ............... 94-37244
Dec. 27, 1994 [KR] Rep. of Korea ............... 94-37249

[51] Int. Cl.$^6$ .................. G11B 5/027; G11B 5/53; G11B 21/18
[52] U.S. Cl. ............................... 360/84; 360/107
[58] Field of Search .................. 360/84, 107, 109, 360/130.24; 384/122, 223–224

[56] References Cited

FOREIGN PATENT DOCUMENTS 63-103645  5/1988  Japan.
1-124113   5/1989  Japan.

*Primary Examiner*—Stuart S. Levy
*Assistant Examiner*—George J. Letscher
*Attorney, Agent, or Firm*—Anderson Kill & Olick, P.C.

[57] ABSTRACT

A head drum assembly for use in a VCR includes a rotary drum, a stationary drum, a motor assembly, and a plurality of piezoelectric bearings. The novel head drum assembly allows smooth rotation by using piezoelectric bearings in the appropriate bearing surfaces. In addition, the head assembly eliminates problems present in conventional head assemblies such as irregular rotation due to damaged ball bearings, lubricant contamination of the heads, and manufacturing difficulties due to the use of ball bearings and lubricant.

3 Claims, 7 Drawing Sheets

HEAD DRUM ASSEMBLY FOR ROTATING A ROTARY DRUM BY GENERATING A LOAD BEARING AIR LAYER

FIELD OF THE INVENTION

The present invention relates to a head drum assembly for use in a video cassette recorder ("VCR"); and, more particularly, to a head drum assembly with an improved rotatability incorporating therein a rotary drum.

DESCRIPTION OF THE PRIOR ART

As is well known, a head drum assembly for use in a VCR comprises a plurality of moving parts, e.g., a rotary drum, and stationary parts, e.g., a stationary drum. Normally, the head drum assembly is broadly classified into either a ball bearing type or a sliding bearing type, depending on how the moving parts and the stationary parts are mechanically interrelated.

There is shown in FIG. 1 a conventional ball bearing type head drum assembly comprising: a rotating shaft 1 divided into an upper part 1a, a middle part 1b, and a motor attachment part 1c; a rotary drum 2 provided with a protruding annular portion on its bottom surface and a plurality of heads (not shown), and fitted tightly around the upper part 1a of the rotating shaft 1; two sets of ball bearings 5 arranged around the middle part 1b of the rotating shaft 1; a stationary drum 4 rotatably fitted around the two sets of ball bearings 5; a motor assembly 3 tightly fitted around the motor attachment part 1c of the rotating shaft 1; a rotor transformer 6 attached to the protruding annular portion on the bottom surface of the rotary drum 2; a stator transformer 7 installed on the stationary drum 4 and facing the rotor transformer 6 while maintaining a set distance therefrom; a thrust support bowl 8 attached to a bottom surface of a rim (not shown) of the stationary drum 4 and filled with a lubricant 9; and a thrust support knob 8a provided at the center of the thrust support bowl 8 and in contact with a bottom surface of the rotating shaft 1. The thrust support knob 8a and the two sets of ball bearings 5 placed between the rotating shaft 1 and the stationary drum 4 allow the rotating shaft 1, and hence the rotary drum 2 attached thereto, to rotate easily.

The thrust support bowl 8 and the thrust support knob 8a provided at the center thereof serve to maintain a predetermined separation between the rotary drum 2 and the stationary drum 4. Since the thrust support bowl 8 is fixed to the stationary drum 4, the thrust support knob 8a attached to the center of the thrust support bowl 8 prevents the rotating shaft 1 and the rotary drum 2 from moving too far down axially in relation to the stationary drum 4. This, in turn, prevents an occurrence of friction due to a direct contact between the rotary drum 2 and the stationary drum 4. To further facilitate an easy rotation of the rotating shaft 1 and the rotary drum 2, the thrust support knob 8a is made of a material with a low friction coefficient, e.g., a polished ruby, thus reducing friction with the rotating shaft 1. In addition, the thrust support bowl 8 is also filled up to a tip (not shown) of the thrust support knob 8a with the lubricant 9. The lubricant 9 reduces friction between the rotating shaft 1 and the thrust support knob 8a even further.

Likewise, the ball bearings 5 arranged around the rotating shaft 1 serve to facilitate the rotation of the rotating shaft 1 and the rotary drum 2 in relation to the stationary drum 4. Since the stationary drum 4 and the rotating shaft 1 interact with each other only through the ball bearings 5 which are capable of rolling easily, the rotating shaft 1 can rotate in relation to the stationary drum 4 with a minimum of friction.

Although this design permits the rotating shaft 1 and the rotary drum 2 to rotate as intended, an irregularity in any one of the ball bearings 5 may give rise to vibrations and cause the rotary drum 2 to rotate in an irregular manner, adversely affecting the ability of the heads attached thereto to read data stored on a magnetic tape. In addition, this design demands a high level of precision during a manufacturing process thereof: if the two sets of ball bearings 5 are not aligned perfectly together, it is virtually impossible to insert the rotating shaft 1 therethrough.

Furthermore, the lubricant 9 held in the thrust support bowl 8 may contaminate the heads, leading to a deterioration of image quality. Also, the lubricant 9 that has to be poured into the thrust support bowl 8 must be carefully measured, lowering a production efficiency of the manufacturing process of the head drum assembly.

FIG. 2, on the other hand, illustrates a conventional sliding bearing type head drum assembly, comprising: a stationary shaft 10 provided with an upper portion 10a and a lower portion 10b, and a plurality of herring-bone shaped grooves or protrusions formed on the upper portion 10a thereof, thereby giving rise to a first set of bearing surfaces 11; a rotary drum 40 fitted around the upper portion 10a of the stationary shaft 10, and equipped with a second set of bearing surfaces 31 that match the first set of bearing surfaces 11; and a stationary drum 20 that fits tightly around the lower portion 10b of the stationary shaft 10. In addition, a thrust bearing 50, with herring-bone shaped grooves on its bottom surface 51, is attached to the rotary drum 40 and serves to constrain the rotary drum 40 from moving towards and coming in contact with the stationary drum 20.

As shown in FIG. 2, the rotary drum 40 and the stationary shaft 10 are in contact only through their respective bearing surfaces 31 and 11, allowing the rotary drum 40 to rotate easily around the stationary shaft 10. The rotatability of the rotary drum 40 is further enhanced by applying a lubricant between the first set of bearing surfaces 11 of the stationary shaft 10 and the second set of bearing surfaces 31.

The lubricant applied between the bearing surfaces 11 and 31 reduces friction between the rotary drum 40 and the stationary shaft 10. The lubricant lowers both a static frictional coefficient and a dynamic frictional coefficient during rotation between the stationary shaft 10 and the rotary drum. Thus, the lubricant allows easy rotation of the rotary drum 40 and also keeps the bearing surfaces 11 and 31 from abrading away when the rotary drum 40 is just beginning to rotate. During rotation, the herring-bone shaped grooves or protrusions serve to continuously draw in the lubricant into a space between the bearing surfaces 11 and 31 and thus further facilitate the rotation of the rotary drum 40.

The sliding bearing type head drum assembly suffers from the disadvantage that if the lubricant used between the rotary drum 40 and the stationary shaft 10 dries up, the bearing surfaces 11, 31 may be damaged by friction, thus causing vibrations during rotation. In addition, since the lubricant can flow and move around between the bearing surfaces 11, 31, some parts of the bearing surfaces 11, 31 may be occasionally covered only by a very thin layer of the lubricant, or not covered by the lubricant at all. In such situations, the parts of the bearing surfaces 11, 31 that are inadequately lubricated may be damaged by friction.

Furthermore, as with the lubricant 9 used in the ball bearing type head drum assembly described above, the lubricant utilized between the bearing surfaces of the sliding bearing type head drum assembly may contaminate the heads, thus adversely affecting the performance of the VCR. Moreover, the amount of lubricant that has to be injected and applied between the bearing surfaces has to be carefully measured, thus lowering the production efficiency. The production efficiency is further lowered due to the fact that it is very difficult to form the herring-bone shaped grooves or protrusions on the bearing surfaces 11.

SUMMARY OF THE INVENTION

It is, therefore, a primary object of the present invention to provide a head drum assembly that is capable of overcoming the shortcomings of the ball bearing type and the sliding bearing type head drum assemblies mentioned above.

It is another object of the present invention to provide a head drum assembly with an improved stability in the rotation of a rotary drum incorporated therein.

In accordance with a preferred embodiment of the present invention, there is provided a head drum assembly for use in a VCR comprising: a stationary shaft, divided into an upper portion and a lower portion; a stationary drum, fitted tightly around the lower portion of the stationary shaft and provided with a stator transformer groove and an axial top surface; a rotary drum, rotatably fitted around the upper portion of the stationary shaft and provided with a slightly protruding axial top surface, a bottom surface, a slightly protruding axial bottom surface, and a bearing surface, as well as a motor rotor groove on its top surface; a stator and a rotor transformers, located in the stator transformer groove of the stationary drum and the bottom surface of the rotary drum, respectively; a motor assembly, including a motor assembly plate, a motor stator on a bottom surface thereof, and a motor rotor installed on a bottom surface of the motor rotor groove by means of a bracket; first piezoelectric axial thrust bearing means; second piezoelectric axial thrust bearing means; and a piezoelectric bearing furnished on the bearing surface of the rotary drum.

In accordance with another embodiment of the present invention, there is provided a head drum assembly for use in a VCR comprising: a rotating shaft, divided into an upper portion, a middle portion, and a lower portion; a rotary drum, tightly fitted around the upper portion of the rotating shaft, and provided with a protruding annular portion on its bottom surface which encloses an axial bottom surface; a stationary drum rotatably fitted around the middle portion of the rotating shaft and provided with a stator transformer groove on its top surface, an axial top surface, a bearing surface, a bottom surface, and a slightly protruding axial bottom surface; a rotor and a stator transformers, installed on the protruding annular portion of the rotary drum and on a bottom surface of the stator transformer groove, respectively; a motor assembly, including a ring collar tightly fitted around the lower portion of the rotating shaft, a motor assembly plate, a motor stator installed on the bottom surface of the stationary drum, and a motor rotor installed on the motor assembly plate; first piezoelectric axial thrust bearing means; second piezoelectric axial thrust bearing means; and a piezoelectric bearing provided on the bearing surface of the stationary drum.

In accordance with yet another preferred embodiment of the present invention, there is provided a head drum assembly for use in a VCR comprising: a stationary drum provided with a top surface and a recessed basin thereon; a rotary drum provided with a motor rotor groove on its top surface, an axial top surface, a bottom surface, and a central protruding portion that rotatably fits into the recessed basin of the stationary drum thereon; a stator and a rotor transformers installed on the top surface of the stationary drum and the bottom surface of the rotary drum, respectively; a motor assembly including a motor assembly plate, a motor stator installed on a bottom surface of the motor assembly plate, and a motor rotor installed on the bottom surface of the motor rotor groove by means of a bracket; piezoelectric axial thrust bearing means; and a piezoelectric bearing provided between the rotary drum and the stationary drum.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
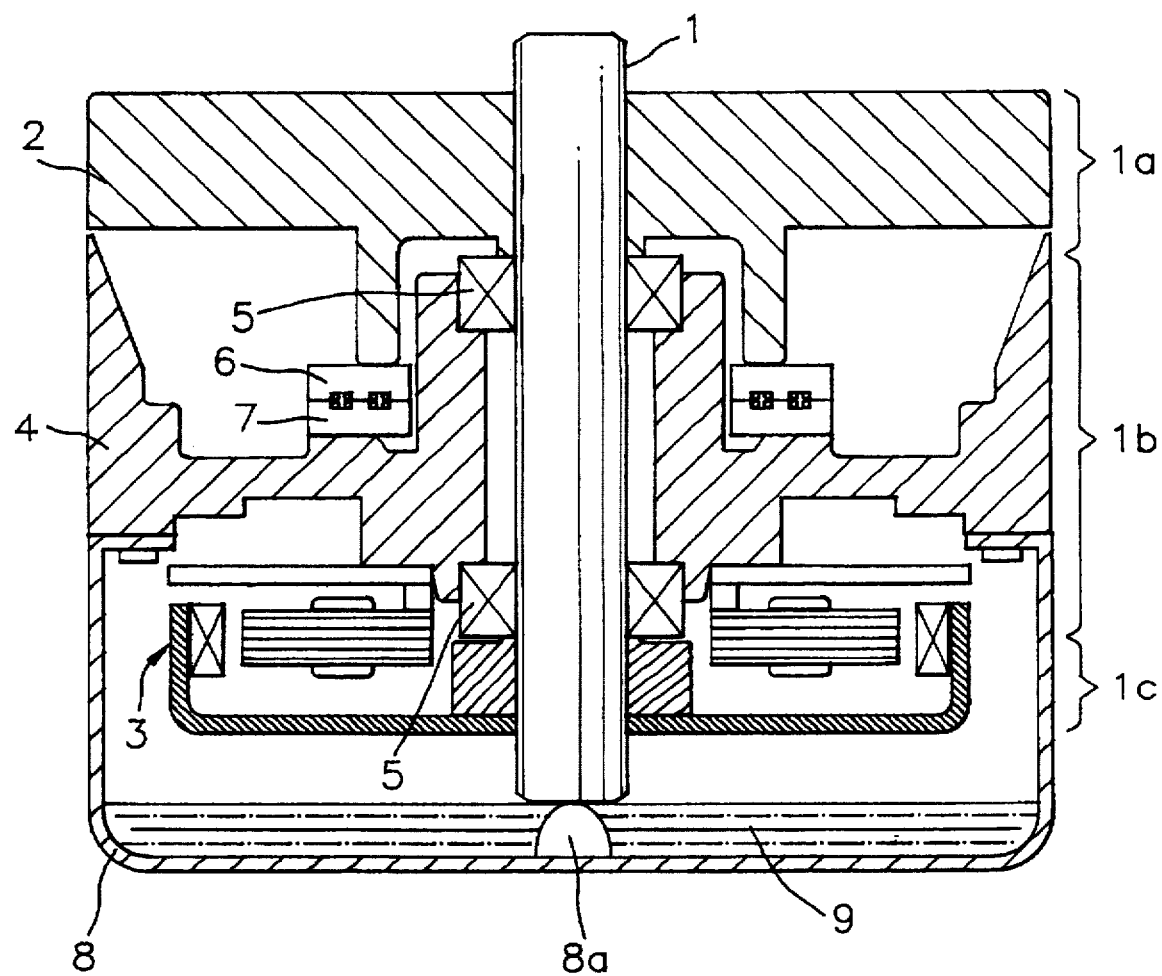
FIG. 1 shows a cross sectional view of a conventional ball bearing type head drum assembly for use in a VCR.
Figure 2:
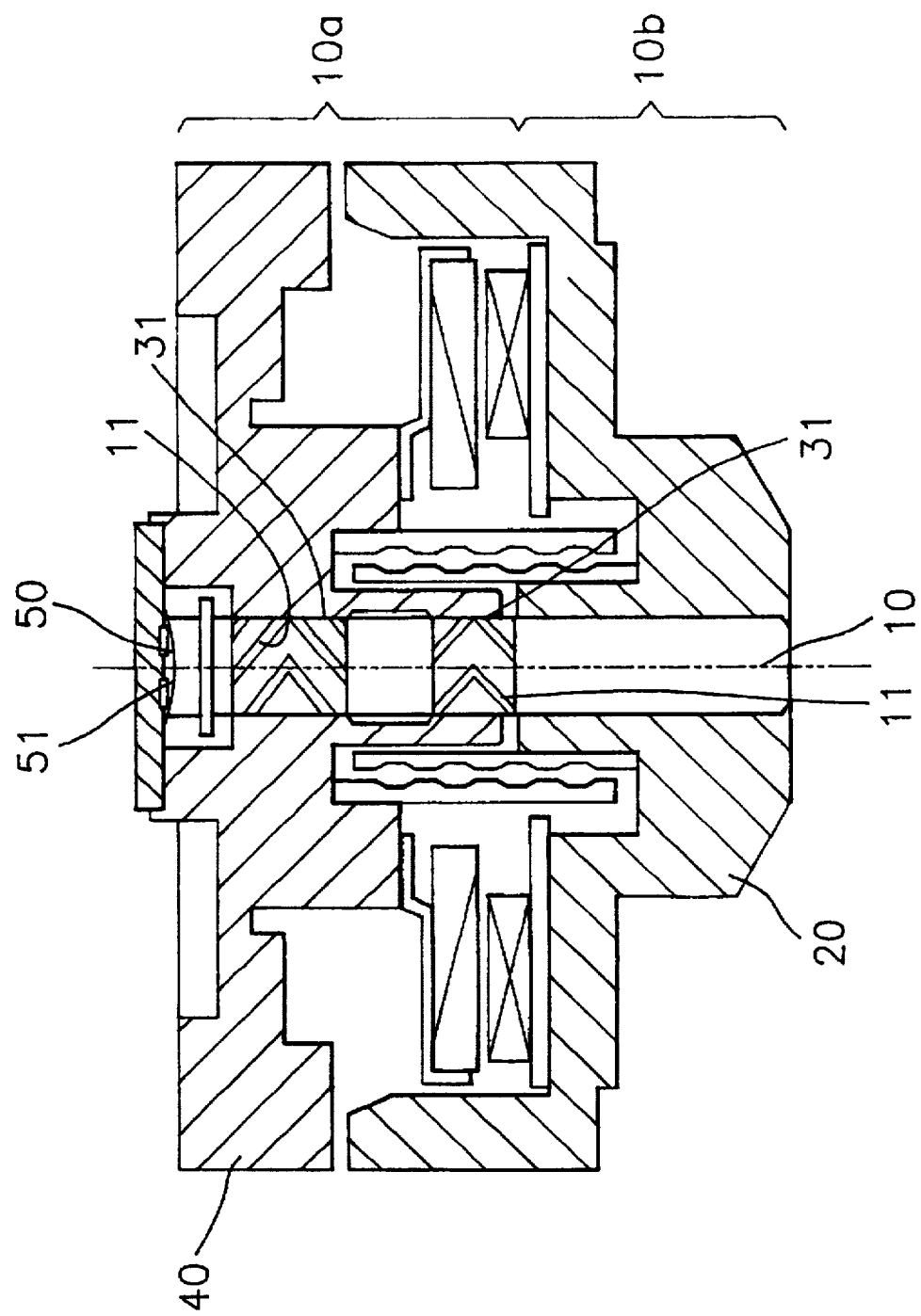
FIG. 2 illustrates a cross sectional view of a conventional sliding bearing type head drum assembly for use in a VCR.
Figure 3:
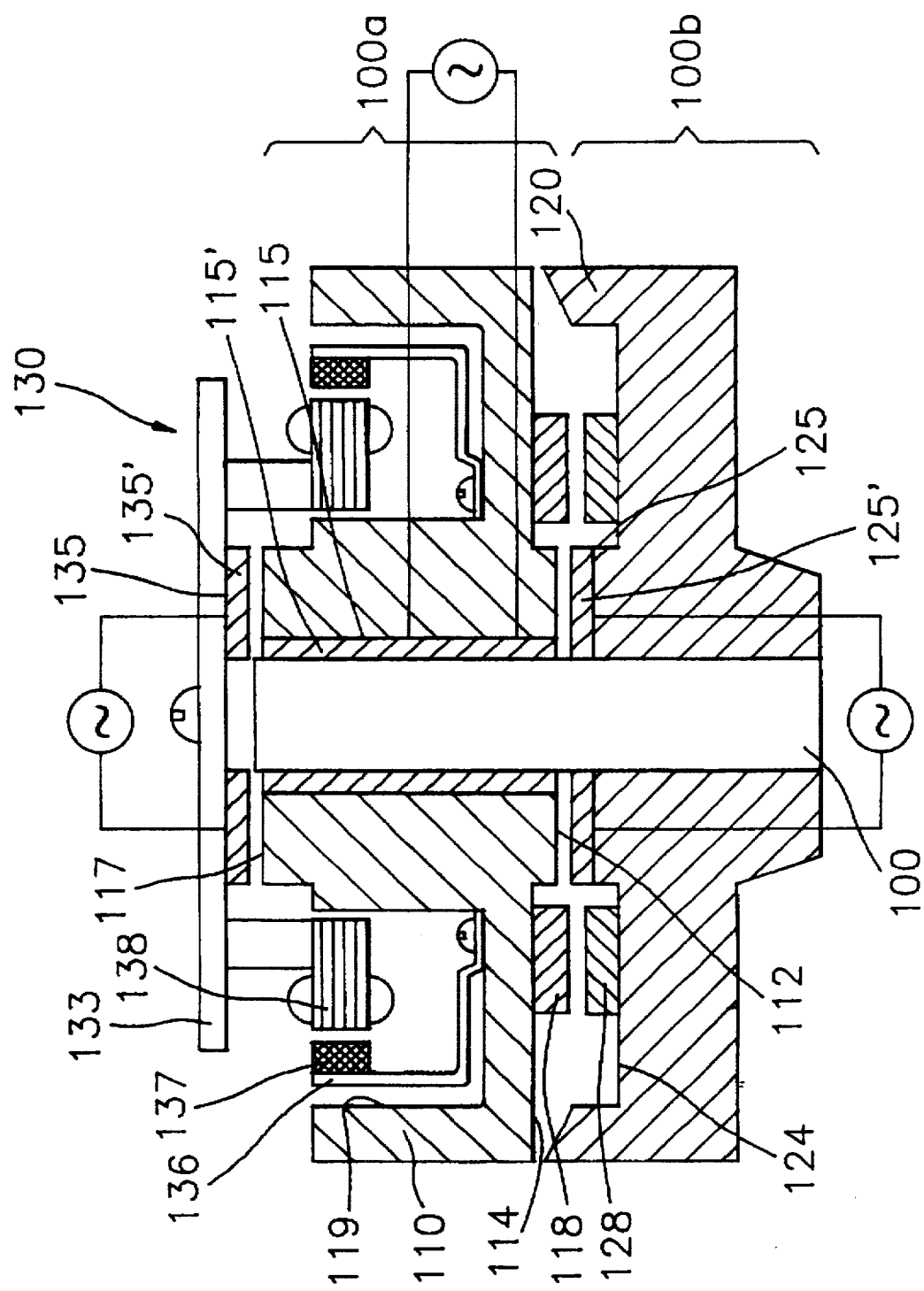
FIG. 3 depicts a cross sectional view of a head drum assembly for use in a VCR in accordance with a preferred embodiment of the present invention.

Referring to FIG. 3, there is shown a cross sectional view of a head assembly for use in a VCR in accordance with a preferred embodiment of the present invention. The head assembly comprises a stationary shaft 100 divided into an upper portion 100a and a lower portion 100b, a rotary drum 110 rotatably fitted around the upper portion 100a of the stationary shaft 100, a stationary drum 120 fitted tightly around the lower portion 100b of the stationary shaft 100, and a motor assembly 130.

The stationary drum 120 is provided on its top surface (not shown) with a shallow stator transformer groove 124 and an axial top surface 125. The rotary drum 110, in turn, is furnished with a bottom surface 114, of which a central portion protrudes slightly to form an axial bottom surface 112. In addition, the rotary drum 110 is also provided, on its top surface (not shown), with a deep motor rotor groove 119 and a protruding axial top surface 117. The rotary drum 110 is also equipped with a bearing surface 115 on an inside surface of a bore hole (not shown) through which the stationary shaft 100 fits. The bearing surface 115 is, in turn, covered by a piezoelectric bearing 115'.

The rotary drum 110 is also provided with a rotor transformer 118 affixed to the bottom surface 114. A stator transformer 128 is installed in the stator transformer groove 124 of the stationary drum 120, while facing and maintaining a set separation from the rotor transformer 118.

The motor assembly 130 is comprised of a motor assembly plate 133, which is immovably affixed to a stationary part (not shown) of the VCR while maintaining a predetermined separation from the stationary drum 120, a motor rotor 137 installed in the motor rotor groove 119 and attached to a bottom surface (not shown) thereof by means of a bracket 136, and a motor stator 138, which is installed on a bottom surface 135 of the motor assembly plate 133 and juts into the motor rotor groove 119 while facing the motor rotor 137.

In addition, first and second piezoelectric axial thrust bearing means are provided between the motor assembly plate 133 and the rotary drum 110, and between the rotary drum 110 and the stationary drum 120, respectively. The first piezoelectric axial thrust bearing means comprises a first annular piezoelectric bearing 135' affixed to a central part of the bottom surface 135 of the motor assembly plate 133 while facing the axial top surface 117 of the rotary drum 110. A second annular piezoelectric bearing 125', installed on the axial top surface 125 of the stationary drum 120 while facing the axial bottom surface 112 of the rotary drum 110, constitutes the second piezoelectric axial thrust bearing means. Alternatively, it is also possible to affix the first annular piezoelectric bearing 135' to the axial top surface 117 so that it faces the bottom surface 135 of the motor assembly plate 133, and/or to install the second annular piezoelectric bearing 125' on the axial bottom surface 112 so that it faces the axial top surface 125 of the stationary drum 120.

The piezoelectric bearing 115' serves to reduce a friction that occurs between the stationary shaft 100 and the rotary drum 110 by creating a load bearing air layer between these two components. As is well known, piezoelectric materials deform, i.e., expand, when an electric field is applied to them. Thus, by applying a sinusoidal voltage signal to the piezoelectric bearing 115', or to the annular piezoelectric bearings 135', 125', it is possible to generate the load bearing air layer.

Figure 6:
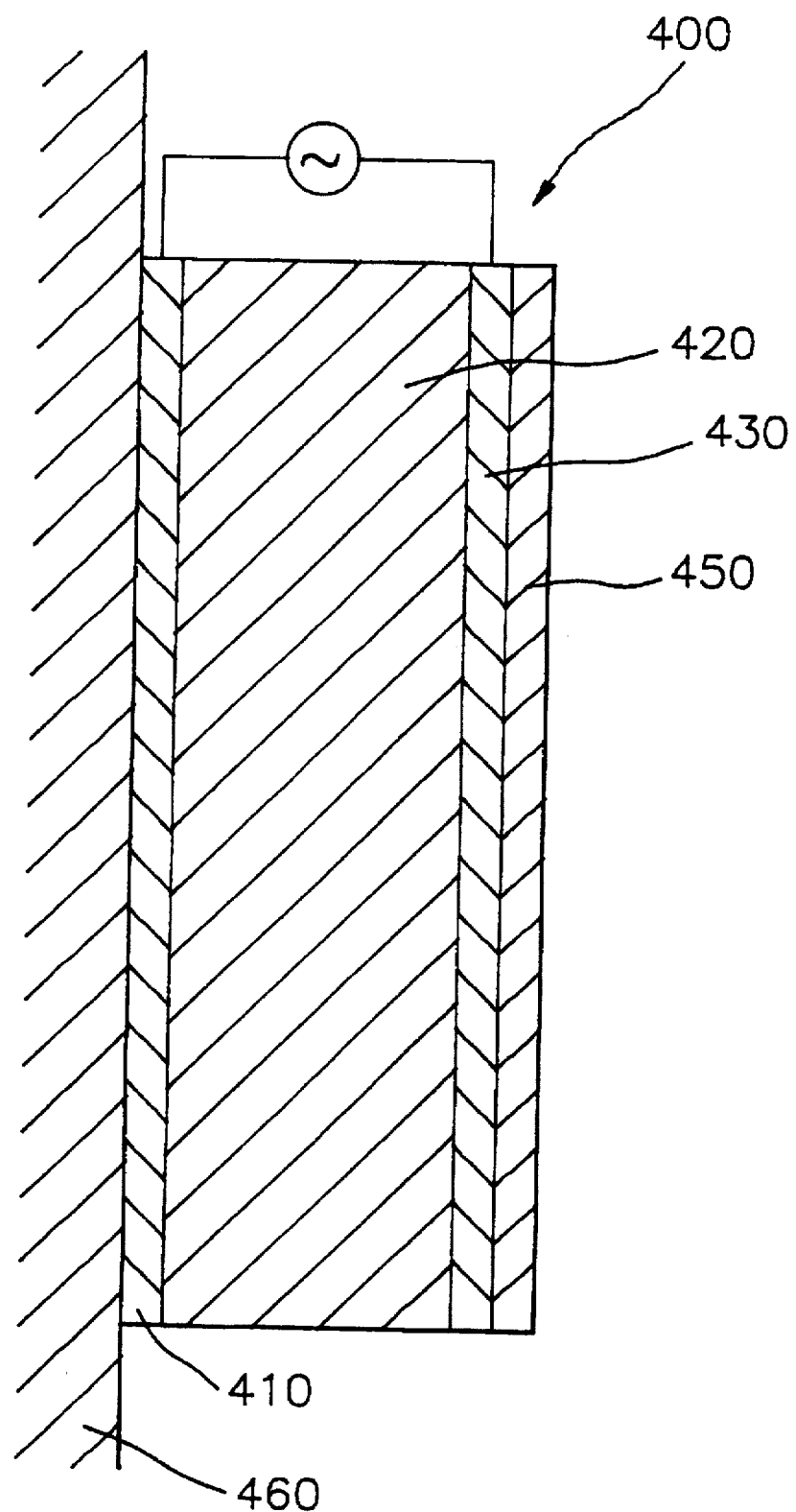
FIG. 6 presents a schematic cross sectional view of a piezoelectric bearing.

FIG. 6 provides a schematic cross sectional view of a piezoelectric bearing 400 and is used to explain how the piezoelectric bearings incorporated in the various embodiments of the present invention function. FIG. 6 is only meant to illustrate how a generic piezoelectric bearing functions, and is not meant to represent the entirety of various piezoelectric bearings incorporated in the embodiments of the present invention.

As can be seen from FIG. 6, one side of the piezoelectric bearing 400 is attached to, and bounded by, a base 460. Thus, the piezoelectric bearing 400 can only expand outward, i.e. in a direction away from the base 460. In the case of the piezoelectric bearing 115', if a voltage is applied thereon, it expands away from the bearing surface 115 to which it is affixed, and towards the stationary shaft 100.

Continuing to refer to FIG. 6, the piezoelectric bearing 400 depicted therein comprises a first electrode layer 410, a second electrode layer 430, a piezoelectric layer 420, and an insulating layer 450. Thus, the piezoelectric layer 420 can be made to expand by applying the voltage across the first and the second electrode layers 430. Since the piezoelectric bearing 400 may come in contact with another part of the VCR (not shown), i.e., in the case of the piezoelectric bearing 115', it may come in contact with the stationary shaft 100, the second electrode layer 430 is covered by the insulating layer 450 made of an electrical insulator, such as rubber. In the alternative, it is also possible to use a high-strength, low frictional coefficient material such as a diamond-like carbon as an insulating material. On the other hand, since the first electrode 410 may be maintained as a ground, it is not absolutely necessary to isolate the first electrode 410 from the base 460. However, should it be desired to insulate the first electrode 410 from the base 460, it is possible to interpose another insulating layer (not shown) between them.

As stated above, it is possible to generate a load bearing air layer by applying the sinusoidal voltage signal to the piezoelectric bearing 400 described above. If the sinusoidal voltage signal having an adequate frequency is applied to the piezoelectric bearing 400, the piezoelectric bearing 400 repeatedly expands and contracts in response to the voltage signal. Since the piezoelectric bearing 400 is constrained to expand only in one direction, a side away from the base 460, i.e., the side that is provided with the insulating layer 450, will rapidly and repeatedly expand outward and contract, beating the air, and generating the load bearing air layer.

The piezoelectric bearing 115' and the first and the second annular piezoelectric bearings 135', 125' function in exactly the same way. As the sinusoidal voltage signal is applied to the piezoelectric bearing 115', it vibrates rapidly, beating the air between the rotary drum 110 and the stationary shaft 100, and generating the load bearing air layer therebetween. The load supporting air layer facilitates rotation of the rotary drum 110 by preventing direct contact between the stationary shaft 100 and the rotary drum 110. Similarly, the first and the second annular piezoelectric bearings 135', 125' function by generating the load bearing air layer between the bottom surface 135 of the motor assembly plate 133' and the axial top surface 117, and between the axial bottom surface 112 and the axial top surface 125 of the stationary drum 120, respectively. However, the load bearing air layers generated by the first and the second piezoelectric axial thrust bearing means, i.e., the first and the second annular piezoelectric bearings 135', 125', serve also to constrain the rotary drum 110 from moving too far down or too far up, as well as to facilitate the rotation of the rotary drum 110. Since the rotor transformer 118 installed on the bottom surface 114 of the rotary drum 110 and the stator transformer 128 provided in the stator transformer groove 124 of the stationary drum 120 must at all times maintain a predetermined separation, the first piezoelectric bearing 135' pushes the rotary drum 110 down, while the second piezoelectric bearing 125' pushes up by generating the load bearing air layers.

Figure 4:
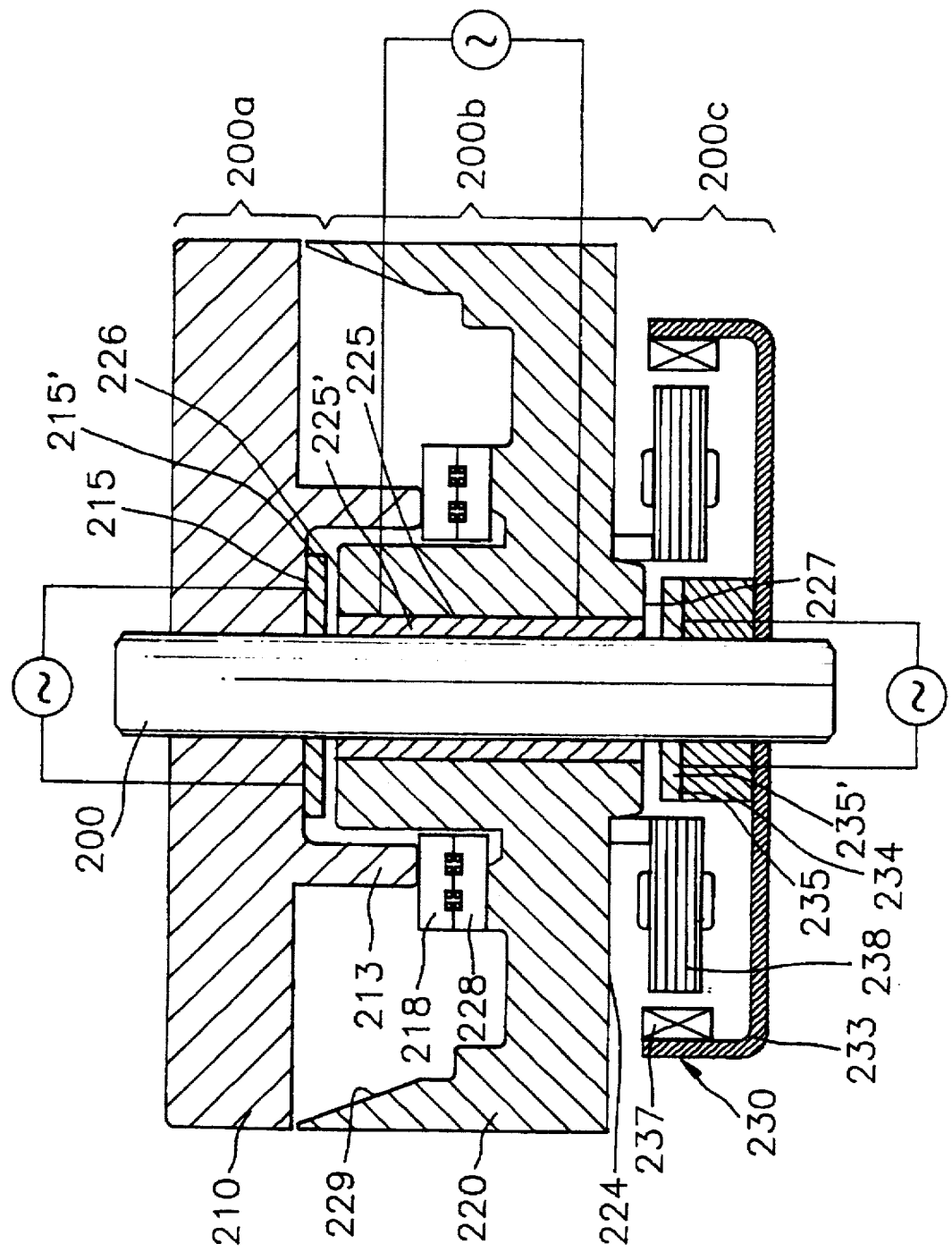
FIG. 4 provides a cross sectional view of a head drum assembly for use in a VCR in accordance with another preferred embodiment of the present invention.

FIG. 4 presents a cross sectional view of a head drum assembly for use in a VCR in accordance with another embodiment of the present invention. The head drum assembly is comprised of a rotating shaft 200 divided into an upper portion 200a, a middle portion 200b, and a lower portion 200c, a rotary drum 210 tightly fitted around the upper portion 200a of the rotating shaft 200, a stationary drum 220 rotatably fitted around the middle portion 200b of the rotating shaft 200, and a motor assembly 230 tightly fitted around the lower part 200c of the rotating shaft 200.

The stationary drum 220 is furnished with a deep stator transformer groove 229 dug around an axial top surface 226. On another side, the stationary drum 220 is provided with a bottom surface 224. A central part of the bottom surface 224 protrudes slightly to form an axial bottom surface 222. In addition, the stationary drum 220 is provided with a bearing surface 225 around an inside surface of a bore hole (not shown) that accommodates the rotating shaft 200. The bearing surface 225 is in turn covered by a piezoelectric bearing 225'.

Meanwhile, the rotating drum 210 is provided with a protruding annular portion 213 on its bottom surface (not shown). The protruding annular portion 213 extends down into the stator transformer groove 229 and encloses an axial bottom surface 215 of the rotary drum 210. A rotor transformer 218 is attached to the protruding annular portion 213 of the rotary drum 210, while a stator transformer 228 is installed on a bottom surface (not shown) of the stator transformer groove 229. The rotor transformer 218 and the stator transformer 228 are facing each other, while maintaining a predetermined separation.

The motor assembly 230 comprises a ring collar 234 provided with a top surface 235 and tightly fitted around the lower portion 200c of the rotating shaft 200, a motor assembly plate 233 attached to a bottom surface (not shown) of the ring collar 234, a motor stator 238 affixed to the bottom surface 224 of the stationary drum 220, and a motor rotor 237 installed on the motor assembly plate 233 while facing the motor stator 238.

The head drum assembly for use in a VCR in accordance with another embodiment of the present invention is also provided with first and second piezoelectric axial thrust bearing means. The first piezoelectric axial thrust bearing means comprises a first annular piezoelectric bearing 215' installed on the axial bottom surface 215 of the rotary drum 210 while facing the axial top surface 226 of the stationary drum 220. In turn, the second piezoelectric axial thrust bearing means comprises a second annular piezoelectric bearing 235' provided on the top surface 235 of the ring collar 234 while facing the axial bottom surface 222 of the stationary drum 220. In the alternative, it is also possible to install the first annular piezoelectric bearing on the axial top surface 226 of the stationary drum 220 so that it faces the axial bottom surface 215, and/or to install the second annular piezoelectric bearing 235' on the axial bottom surface 222 of the stationary drum 220 so that it faces the top surface 235 of the ring collar 234.

The head assembly for use in a VCR in accordance with another preferred embodiment of the present invention also achieves an easy rotation of the rotary drum 210 by means of the load bearing air layers generated by the piezoelectric bearings incorporated therein. The piezoelectric bearings 225', 215', 235' function in exactly the same way as the generic piezoelectric bearing 400 described above. That is, the piezoelectric bearing 225' vibrates rapidly and generates the load bearing air layer between the stationary drum 220 and the rotating shaft 200, while the annular piezoelectric bearings 215', 235' generate load bearing air layers that constrain the rotary drum 210 from moving too far down or too far up in relation to the stationary drum 220.

Figure 5:
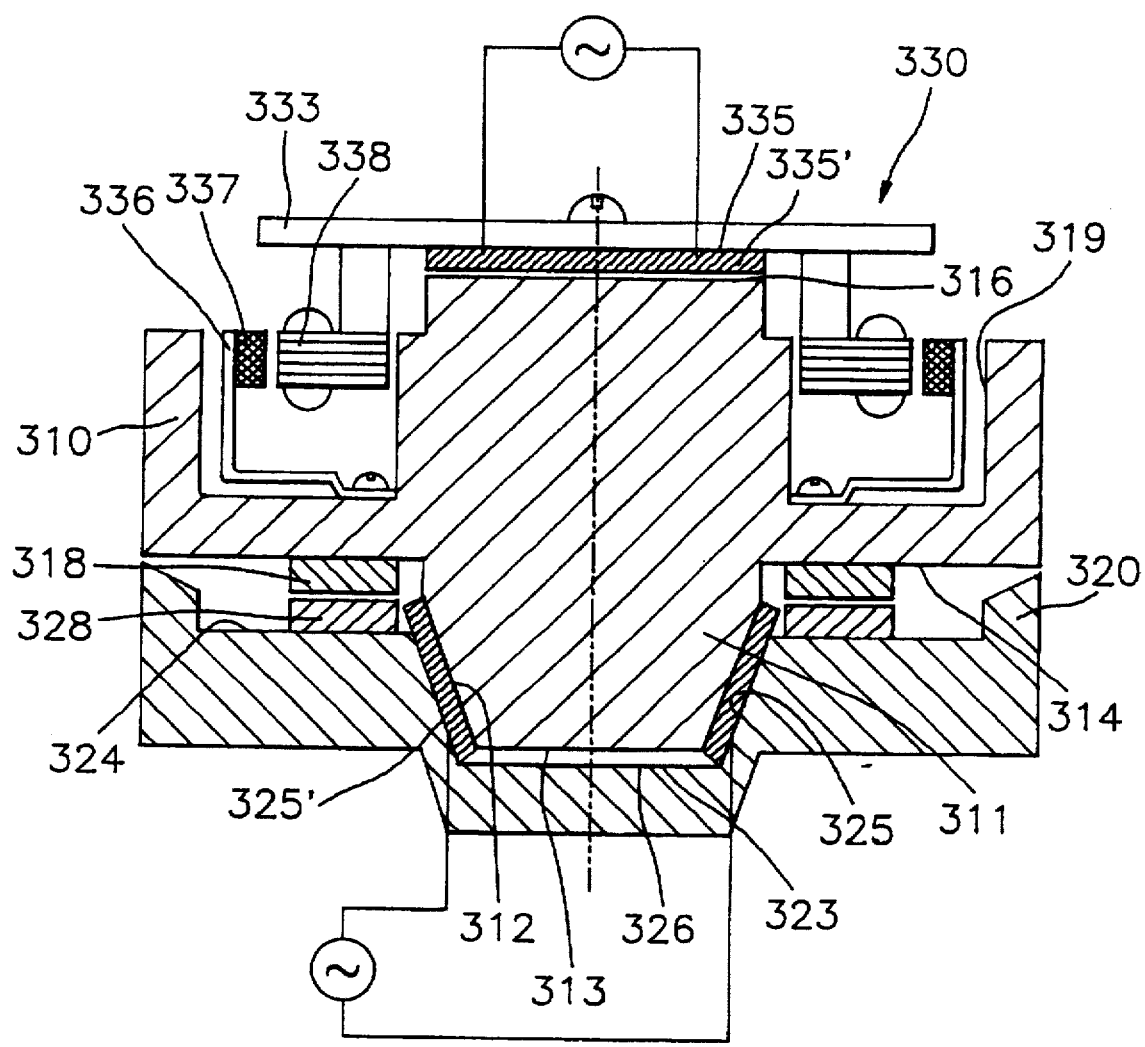
FIG. 5 offers a cross sectional view of a head drum assembly for use in a VCR in accordance with yet another preferred embodiment of the present invention.

FIG. 5, on the other hand, is a cross sectional view of a head drum assembly for use in a VCR in accordance with yet another embodiment of the present invention. The head drum assembly includes a rotary drum 310, a stationary drum 320, and a motor assembly 330 situated above the rotary drum 310.

The stationary drum 320 is provided with a top surface 324 and a recessed basin 323 provided at a central part (not shown) of the top surface 324. The recessed basin 323 includes a flat central bottom surface 326 and a side surface 325 which inclines outward. Meanwhile, the rotary drum 310 incorporates therein a deep motor rotor groove 319 provided around a slightly protruding axial top surface 316, a bottom surface 314, and a central protruding portion 311 which juts out from a central portion (not shown) of the bottom surface 314 and projects into the recessed basin 323. The central protruding portion 311 is roughly shaped like an upside down cone with its pointed end cut off. The side surface 325 of the recessed basin 323 and a side surface 312 of the central protruding portion 311 are parallel, i.e., they have a same inclination. In addition, the bottom surface 326 of the recessed basin 323 and a flat bottom surface 313 of the central protruding portion 311 are parallel in a facing relationship, while maintaining a predetermined separation from each other.

The motor assembly 330 comprises a motor assembly plate 333, immovably secured to another part (not shown) of the VCR, a motor stator 338 attached to a bottom surface 335 of the motor assembly plate 333, and a motor rotor 337 situated in the motor rotor groove 319 and affixed to a bottom surface (not shown) thereof by means of a bracket 336.

In addition, the head drum assembly described above also includes axial thrust bearing means and a piezoelectric bearing 325'. The axial thrust bearing means comprises a circular piezoelectric bearing 335' installed on a central portion of the bottom surface 335 of the motor assembly plate 333, while facing the axial top surface 316 of the rotary drum 310. The piezoelectric bearing 325' is in turn affixed to the side surface 325 of the recessed basin 323, while facing the side surface 312 of the central protruding portion 311 of the rotary drum 310. Alternatively, it is also possible to install the circular piezoelectric bearing 335' on the axial top surface 316 of the rotary drum 310 so that it faces the bottom surface 335 of the motor assembly plate 333, and/or to affix the piezoelectric bearing 325' onto the side surface 312 of the central protruding portion 311 so that it faces the side surface 325 of the recessed basin 323.

As in the head drum assemblies described earlier, the piezoelectric bearings 335', 325' incorporated in the head drum assembly in accordance with yet another preferred embodiment of the present invention serve to improve rotatability of the rotary drum 310 and to constrain it from moving too far down or too far up in relation to the stationary drum 320. The piezoelectric bearing 325' furnished on the side surface 325 of the recessed basin 323 generates the load bearing air layer between the central protruding portion 311 and the side surface 325. The load bearing air layer thus generated will exert a force in a direction perpendicular to the side surface 325. Thus, in addition to ensuring that the rotary drum 310 will rotate while staying coaxial with respect to the stationary drum 320, i.e., while preventing the side surface 312 of the central protruding portion 311 from directly contacting the side surface 325 of the recessed basin 323, the load bearing air layer generated by the piezoelectric bearing 325' prevents the rotary drum 310 from moving too far down. A vertical component of the force exerted by the load bearing air layer against the slanted side surface 312 of the central protruding portion 311, in combination with a downwards force applied by the circular piezoelectric bearing 335', ensures that the predetermined separation can be maintained between the rotor and the stator transformers 318, 328, and between the bottom surface 326 of the recessed basin 323 and the bottom surface 313 of the central protruding portion 311.

In the alternative, it is also possible to furnish the rotary drum with the recessed basin, and the stationary drum with a central protruding portion that rotatably fits therein. Obviously, in this case, the central protruding portion will look like an upwards pointing cone that has its pointed end cut off. The inclination of the side surface of the recessed basin and the piezoelectric bearing provided thereon will also have to be modified to match the new inclination of the side surface of the central protruding portion.

Figure 7:
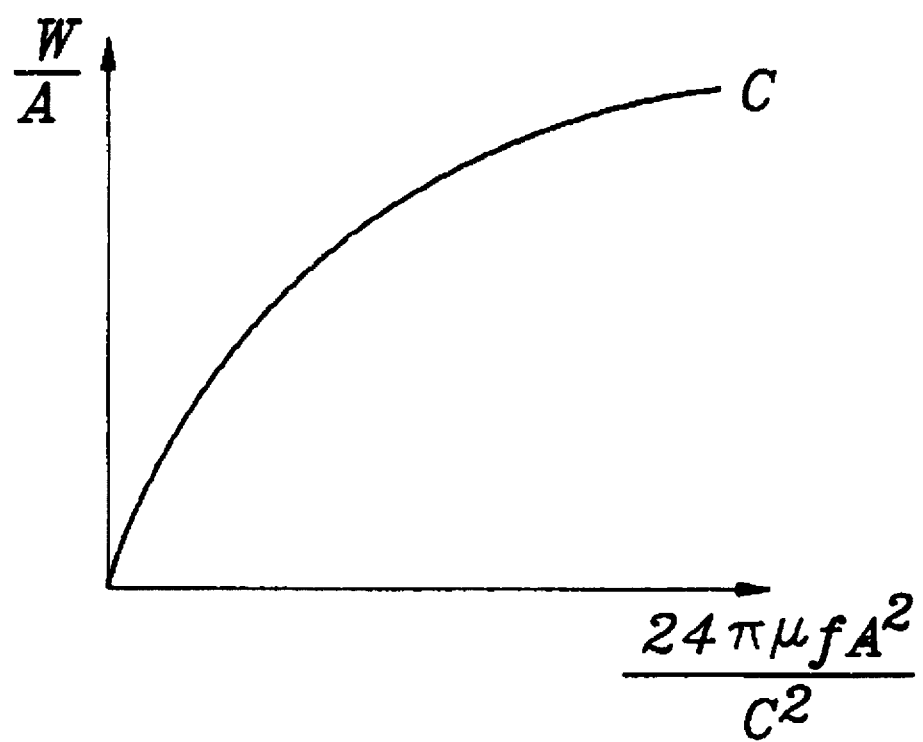
FIG. 7 sets forth a distribution chart demonstrating the load bearing capacity of an air layer generated by a piezoelectric bearing.

FIG. 7 presents a distribution chart showing the relationship between the load bearing ability of the air layer generated by the piezoelectric bearings and different variables. The relationship can be expressed as:

$$W/A \approx 24\, \pi\mu f A^2/C^2$$

wherein W is the load bearing ability, μ is the air viscosity, A is the surface area of a piezoelectric bearing, C is the separation between the piezoelectric bearing and an opposing surface wherein the air layer is present, and f is the frequency of the sinusoidal voltage signal applied to the piezoelectric bearing.

It can be seen from this relation that a desired load bearing ability can be reached by choosing adequate values for the surface area of the piezoelectric bearings, the separation between the piezoelectric bearings and their opposing surfaces, and the frequency at which the piezoelectric bearings expand and contract.

The head drum assemblies in accordance with the present invention described above are less likely to wear and tear or malfunction during the operation of the VCR due to defective ball bearings or lubricant contamination of the heads. The inventive head drum assemblies achieve a smooth rotation by utilizing the piezoelectric bearings on the appropriate bearing surfaces.

The present invention has the added advantage in that it eliminates a need to provide bearing surfaces with herring-bone shaped grooves or protrusions. The herring-bone shaped grooves or protrusions on the rotating shafts or the stationary drums of sliding bearing type head drum assemblies have to be worked into the shaft or the drum proper, greatly complicating the manufacturing process thereof.

In addition, the present invention further lowers the manufacturing cost of the head drum assembly by dispensing with the need to carefully measure and apply the lubricant and with the need to provide a thrust support knob made of an expensive material, e.g., polished ruby.

While the present invention has been shown and described with reference to the particular embodiments, it will be apparent to those skilled in the art that many changes and modifications may be made without departing from the spirit and scope of the invention as defined in the appended claims.

What is claimed is:

1. A head drum assembly for use in a video cassette recorder comprising:

a stationary shaft;

a stationary drum fitted tightly around a lower portion of the stationary shaft;

a rotary drum rotatably fitted around an upper portion of the stationary shaft;

a motor assembly installed above the rotary drum;

first and second annular piezoelectric bearings for generating a load bearing air layer between the motor assembly and the rotary drum and between the stationary drum and the rotary drum, respectively;

piezoelectric bearings for generating a load bearing air layer between the stationary shaft and the rotary drum; and means for applying sinusoidal voltage signals to the individual piezoelectric bearings, to thereby allow the rotary drum to rotate in a predetermined position and reduce a friction between the stationary shaft and the rotary drum.

2. A head drum assembly for use in a video cassette recorder, comprising:

a rotating shaft;

a rotary drum tightly fitted around an upper portion of the rotating shaft;

a stationary drum fitted around a middle portion of the rotating shaft;

a motor assembly tightly fitted around a lower portion of the rotating shaft;

first and second annular piezoelectric bearings for generating a load bearing air layer between the stationary drum and the rotary drum and between the motor assembly and the stationary drum, respectively;

piezoelectric bearings for generating a load bearing air layer between the rotating shaft and the stationary drum; and means for applying sinusoidal voltage signals to the individual piezoelectric bearings, to thereby allow the rotary drum to rotate in a predetermined position and reduce a friction between the rotating shaft and the rotary drum.

3. A head drum assembly for use in a video cassette recorder comprising:

a stationary drum provided with a recessed basin;

a rotary drum having a slanted side that rotatably fits into the recessed basin of the stationary drum;

a motor assembly installed above the rotary drum;

first and second annular piezoelectric bearings for generating a load bearing air layer between the rotary drum and the motor assembly and between the slanted side of the rotary drum and the recessed basin of the stationary drum, respectively, whereby the load bearing air layer exerts a force in a direction perpendicular to said slanted side of said rotary drum and said recessed basin of said stationary drum, thereby preventing said slanted side of said rotary drum from directly contacting said recessed basin of said stationary drum; and means for applying sinusoidal voltage signals to the individual piezoelectric bearings, to thereby allow the rotary drum to rotate in a predetermined position and reduce a friction between the recessed basin of the stationary drum and the slanted side of the rotary drum.

* * * * *